(12) United States Patent
Bu et al.

(10) Patent No.: US 7,938,568 B2
(45) Date of Patent: May 10, 2011

(54) LED BACKLIGHT DEVICE

(75) Inventors: Zhanchang Bu, Beijing (CN); Guannan Song, Beijing (CN)

(73) Assignee: Beijing Boe Optoelectronics Technology Co., Ltd., Beijing (CN)

( * ) Notice: Subject to any disclaimer, the term of this patent is extended or adjusted under 35 U.S.C. 154(b) by 362 days.

(21) Appl. No.: 12/125,158

(22) Filed: May 22, 2008

(65) Prior Publication Data

US 2009/0034289 A1 Feb. 5, 2009

(30) Foreign Application Priority Data

Aug. 3, 2007 (CN) .......................... 2007 1 0119944

(51) Int. Cl.
*F21V 7/04* (2006.01)
(52) U.S. Cl. ........................................ 362/621; 362/622
(58) Field of Classification Search .................. 362/621, 362/622
See application file for complete search history.

(56) References Cited

U.S. PATENT DOCUMENTS

| | | | | |
|---|---|---|---|---|
| 7,039,286 B2* | 5/2006 | Leu et al. | ....................... | 385/129 |
| 2004/0066645 A1* | 4/2004 | Graf et al. | ....................... | 362/31 |
| 2005/0219836 A1* | 10/2005 | Hung | ............................. | 362/97 |
| 2006/0256580 A1* | 11/2006 | Kang et al. | ..................... | 362/614 |
| 2006/0285352 A1* | 12/2006 | Kim | ............................... | 362/558 |
| 2007/0147070 A1* | 6/2007 | Yang et al. | ..................... | 362/600 |
| 2007/0165419 A1* | 7/2007 | Horiuchi et al. | ............... | 362/606 |
| 2008/0062720 A1* | 3/2008 | Chung et al. | ................... | 362/620 |

FOREIGN PATENT DOCUMENTS

| | | |
|---|---|---|
| CN | 1532609 A | 9/2004 |
| CN | 1601353 A | 3/2005 |
| CN | 1619840 A | 5/2005 |

\* cited by examiner

*Primary Examiner* — Jong-Suk (James) Lee
*Assistant Examiner* — David J Makiya
(74) *Attorney, Agent, or Firm* — Ladas & Parry LLP

(57) ABSTRACT

There is provided a light emitting diode (LED) backlight device comprising a light guide plate and a light module composed of a plurality of LEDs. A haze structure is disposed between a light incident surface of the light guide plate and each LED. Haze value of the haze structure is varied with a high value at a position closing to an optical axis of the LEDs and a low value at a position further away from the optical axis of the LEDs.

7 Claims, 2 Drawing Sheets

LED BACKLIGHT DEVICE

BACKGROUND OF THE INVENTION

The embodiment of the present invention relates to a light emitting diode (LED) backlight device.

A backlight device is a component providing back light for display products and is widely employed in various applications such as information, communication and consumer products. Among them, LED backlight devices draw more and more attention from manufacturers due to its advantages such as low power consumption, full color saturation, low contamination and long service life etc. However, since a light intensity of a LED exhibits a Gauss distribution, a LED module made by arranging a plurality of LEDs in either line or matrix form exhibits dark spots in illumination area, so that it is difficult to obtain a surface light source of a good uniformity with LEDs, even after the light from the LEDs previously enters a light guide plate and is diffused by dot patterns formed on the light guide plate and reflected by the bottom reflective sheet.

As shown in FIG. 5, which shows a conventional LED backlight structure, a prism sheet 10 is disposed between a LED module 20 and a light incident surface of a light guide plate 30. The prism sheet 10 focuses the lights from the LED module 20 with a relatively wide angle distribution so as to provide a parallel and uniform light to the light guiding plate 30.

SUMMARY OF THE INVENTION

According to an aspect of an embodiment of the present invention, there is provided a light emitting diode (LED) backlight device, in which the light entering the light guiding plate is more focused and more uniformly distributed, thus improving the light efficiency and uniformity of LED backlight device.

According to an aspect of an embodiment of the present invention, there is provided a LED backlight device. In assembling of such LED backlight device, it is not necessary to have a mounting and securing mechanical means, therefore improving assembling efficiency.

According to an aspect of an embodiment of the present invention, there is provided a LED backlight device comprising a light guide plate and a light module composed of a plurality of LEDs. A haze structure is disposed between a light incident surface of the light guide plate and each LED. A haze value of the haze structure is varied with a high value at a position corresponding to an optical axis of each of the LEDs and a low value at a position further away from the optical axis of the nearest LED.

The haze structure can be disposed on the light incident surface of the light guiding plate such that it is not necessary to have mounting and securing mechanical means during assembling, therefore improving assembling efficiency.

According to the embodiment of the present invention, a haze structure is disposed between the light module and the incident surface of the light guiding plate in a LED backlight device, thereby the light entering the light guide plate is focused more and distributed more uniformly, thus improving light efficiency and uniformity of the LED backlight device.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the following detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF THE PREFERRED EMBODIMENTS

Figure 1:
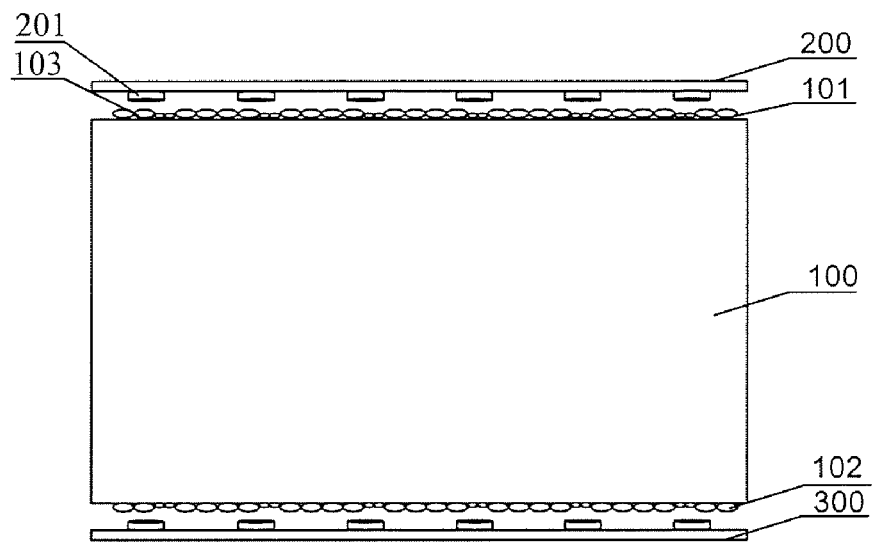
FIG. 1 is a schematic view of a LED backlight device according to an embodiment of the present invention.

FIG. 1 is a schematic view of a LED backlight device according to an embodiment of the present invention. The LED backlight device comprises a light module 200, a light module 300 and a light guide plate 100. The light module 200 and the light module 300 can be composed of a single LED or a plurality of LEDs arranging in either a line or matrix formation. A haze structure 101 and a haze structure 102 are disposed on light incident surfaces of the light guiding plate 100, respectively. In operation, the light from the light module 200 and 300 is diffused by the haze structure 101 and the haze structure 102, and then is incident onto the light incident surface (side surface) of the light guiding plate 100. The incident light is further diffused for example by a dot pattern formed on the lower surface of the light guiding plate 100 and reflected by a reflective sheet under the light guiding plate 100 and eventually transmitted through optical sheets, such as a diffusing sheet and a prism sheet, which are disposed above the light guiding plate 100, to create a surface light source. The optical sheets such as the diffusing sheet and the prism sheet are not shown in FIG. 1.

Figure 2:
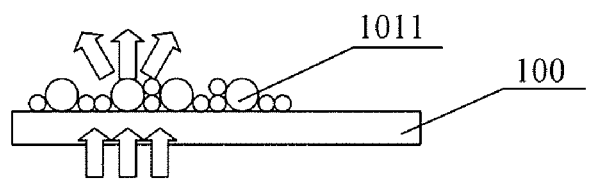
FIG. 2 is a schematic view for explaining a light scattering theory.

As shown in FIG. 2, according to a light scattering theory, when a light is incident on scattering particles 1011, it will be scattered. A haze value of a the scattering particles 1011 can be defined as the ratio of the flux of scattering light deflecting from the incident direction and the flux of transmitting light in the incident direction, which is represented in percentage. In the present embodiment, the scattering particles forming the haze structure have a width in a range of about 40 microns to 80 microns and a height in a range of about 20 microns to 40 microns. The haze value of the haze structure can be varied by changing the dimensions as well as the density distribution of the scattering particles in the haze structure, which in turn causing different degree of scattering. The larger the haze value is, the greater the scattering becomes. Therefore, the haze value profile of the haze structure 101 and the haze structure 102 can be designed to obtain an incident light with a high efficiency and a good uniformity. In the present embodiment, both the haze value profile of the haze structure 101 and the haze structure 102 may follow a specific function curve.

A haze value profile of the haze structure with incident light from a single LED 201 is first discussed with reference to FIGS. 1 and 3.

Assuming that the angle between the optical axis of the LED 201 and the normal line of the incident surface of the light guiding plate 100 is a light emitting angle of the LED 201. The light emitting angle of a LED can be varied for different packaging processes. The haze value profile of the haze structure can be a part of a sine curve and can be adjusted according to the light intensity. The representation for the haze value profile can also be varied based on different light emitting angles. In the present embodiment, the haze value profile of the haze structure is designed with a light emitting angle of 80 degree for the LED 201.

For the LED 201, the intensity profile of the incident light exhibits a Gauss distribution, that is, the light intensity of the incident light is the highest at a position corresponding to the optical axis of LED 201 and is lowered as the position is further away from the optical axis of the LED 201.

The haze value profile of the haze structure 103 corresponding to the LED 201 can be designed based on the above. In order to make the incident light onto the light guiding plate more uniform, the haze value profile of the haze structure 103 is designed such that the haze value of the haze structure is large at a position with a high light intensity, thus the light scattering can be also greater at that position. Therefore, the light from the LED 201 can be rendered uniform.

Figure 3:
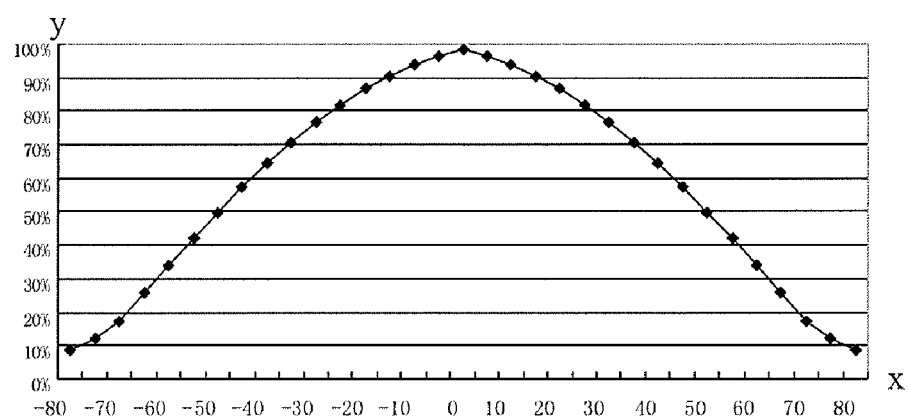
FIG. 3 is a graph showing a haze value profile of a haze structure corresponding to a single LED according to an embodiment of the present invention.

FIG. 3 is a graph showing a haze value profile of a haze structure corresponding to a single LED. As shown in FIG. 3, the profile can be represented by the following expression:

$$y=\sin [\pi(80-|x|)/180]*100\% \; x \in [-74,0] \cup [0,74]$$

$$y=10\% \; x \in [-80,-74] \cup [74,80]$$

where for a position in the haze structure, x represents an angle away from the optical axis of the LED 201 at that position, that is, the angle between the line connecting the position and the LED 201 and optical axis of the LED 201, and y represents a haze value of that position. It can be seen from FIG. 3 and the above expression that the haze value of the haze structure is the largest at the optical axis of the LED 201, that is, y is in a maximum value at x=0. At $x \in [-74,0] \cup [0,74]$, the larger the angle away from the optical axis of the LED 201, the lower the haze value is. At $x \in [-80,-74] \cup [74,80]$, y is in a minimum value. As shown in FIG. 3, the haze value changes in a smooth transition curve from high value to low value as the angle is further away the optical axis of the LED 201. The haze value can be in a range from about 98%-10% with the maximum value of 98% and the minimum value of 10%.

Figure 4:
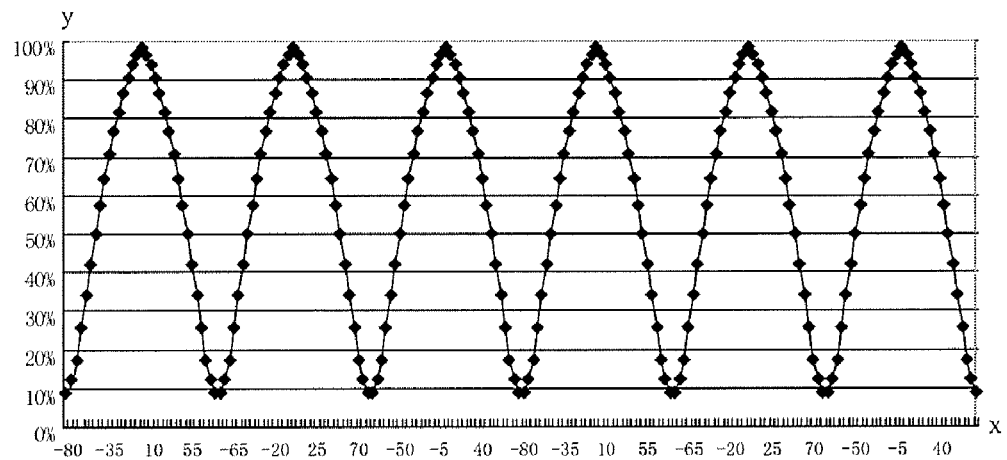
FIG. 4 is a graph showing a haze value profile of a haze structure corresponding to a light module made of a plurality of LEDs according to an embodiment of the present invention.
Figure 5:
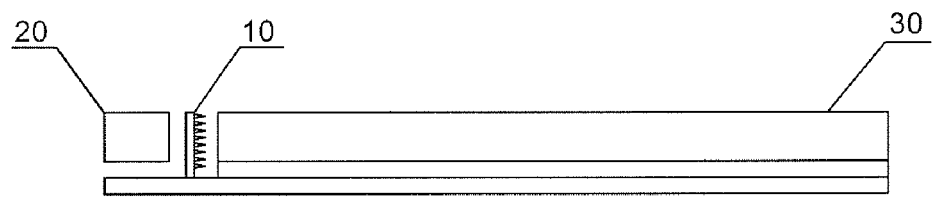
FIG. 5 is a schematic view of a conventional backlight device.

A haze value profile of the haze structure 101 with incident light from a light module 200 is discussed with reference to FIG. 4.

In the present embodiment, the light module 200 is formed of six LEDs spaced apart from each other with an appropriate interval. FIG. 4 is a graph showing a haze value profile of a haze structure corresponding to such light module, which is a sum of a plurality of profile shown in FIG. 3.

For a position in the haze structure 101, the closest LED is selected as the light source. The angle between the line connecting the light source and the position and the optical axis of the light source is assumed as the angle away from the optical axis of the LED. The haze value profile of the haze structure 101 corresponding to a light module is based on the haze value profile of the haze structure corresponding to a single LED, which is similar to a sine wave curve, where x represents the angle away from the optical axis of the closest LED, and y represents the haze value. The haze value profile of the haze structure 102 and 101 can be the same.

In the above embodiment, the haze structure 101 and 102 can also be separated so as to be disposed between the light module 200 and light guide plate 100 as well as between the light module 300 and the light guide plate 100, respectively.

The embodiment of the present invention can be also applied to a light guide plate in a wedge form or a light guide plate with a light module on a single side, such as in a case of the LED backlight for a laptop computer.

According to the embodiment of the present invention, a haze structure is disposed between the light module and incident surface of the light guiding plate in a LED backlight device, and thereby the light entering the light guide plate is focused more and distributed more uniformly, thus improving the light efficiency and uniformity of the LED backlight device. Furthermore, the haze structure can be disposed on the light incident surface of the light guiding plate such that it is not necessary to have mounting and securing mechanical means in assembling, therefore improving assembling efficiency.

The invention being thus described, it will be obvious that the same may be varied in many ways. Such variations are not to be regarded as a departure from the spirit and scope of the invention, and all such modifications as would be obvious to those skilled in the art are intended to be included within the scope of the following claims.

What is claimed is:

1. A light emitting diode (LED) backlight device comprising:
a light guide plate,
a light module composed of a plurality of LEDs, and
a haze structure disposed between a light incident surface of the light guide plate and each LED,
wherein a haze value of the haze structure is varied with a high value at a position corresponding to an optical axis of each of the LEDs and a low value at a position further away from the optical axis of the nearest LED, and
wherein the haze value is a ratio of a flux of scattering light deflecting from an incident direction and a flux of transmitting light in the incident direction, and the haze value at a position in the haze structure is changed according to the following expression:

$$y=\sin [\pi(80-|x|)/180]*100\% \; x \in [-74,0] \cup [0,74]$$

$$y=10\% \; x \in [-80,-74] \cup [74,80]$$

wherein x represents the angle away from the optical axis of the nearest LED at the position, and y represents the haze value.

2. The LED backlight device according to claim 1, wherein the haze structure is disposed on the light incident surface of the light guide plate.

3. The LED backlight device according to claim 1 or 2, wherein the haze value of the haze structure is in a range of 98%-10%.

4. The LED backlight device according to claim 1 or 2, wherein the haze value is 98% at a position corresponding to the optical axis of each of the LEDs.

5. The LED backlight device according to claim 1 or 2, wherein the haze value is 10% at a position furthest away from the optical axis of adjacent LEDs.

6. The LED backlight device according to claim 1 or 2, wherein the haze structure is formed of a plurality of scattering particles, and each particle has a width in a range of about 40 microns to 80 microns and a height in a range of about 20 microns to 40 microns.

7. A light emitting diode (LED) backlight device comprising:
   a light guide plate,
   a light module composed of a plurality of LEDs, and
   a haze structure disposed on a light incident surface of the light guide plate and between the light incident surface and each LED,
   wherein a haze value of the haze structure is varied in a range of 98%-10% with a high value at a position corresponding to an optical axis of each of the LEDs and a low value at a position further away from the optical axis of each of the LEDs, and wherein the haze value is a ratio of a flux of scattering light deflecting from an incident direction and a flux of transmitting light in the incident direction and the haze value at a position in the haze structure is changed according to the following expression:

$$y=\sin[\pi(80-|x|)/180]*100\%\ x\in[-74,0]\cup[0,74]$$

$$y=10\%\ x\in[-80,-74]\cup[74,80]$$

wherein x represents the angle away from the optical axis of the nearest LED at the position, and y represents the haze value.

* * * * *